US007966348B2

(12) United States Patent
Chen et al.

(10) Patent No.: US 7,966,348 B2
(45) Date of Patent: Jun. 21, 2011

(54) DYNAMIC ONTOLOGY-DRIVEN TEMPLATE SELECTION

(75) Inventors: Feng-wei Chen, Cary, NC (US); John M. Holtman, Raleigh, NC (US); Ju Y. Lee, Durham, NC (US); Margaret H. Mago, Durham, NC (US); Nikhil R. Parekh, Research Triangle Park, NC (US); William R. Reed, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 403 days.

(21) Appl. No.: 12/147,702

(22) Filed: Jun. 27, 2008

(65) Prior Publication Data

US 2009/0327337 A1    Dec. 31, 2009

(51) Int. Cl.
*G06F 7/00* (2006.01)
(52) U.S. Cl. ...................................... 707/803
(58) Field of Classification Search .................. 707/790, 707/791, 793, 795, 797, 803, 810, 809, 999.101, 707/736, 737, 740, 756, 802, 812, 796, 705
See application file for complete search history.

(56) References Cited

U.S. PATENT DOCUMENTS

| 5,694,523 | A  | * | 12/1997 | Wical | 706/45 |
| 6,199,034 | B1 | * | 3/2001 | Wical | 704/9 |
| 7,693,812 | B2 | * | 4/2010 | Lim et al. | 707/999.001 |
| 2004/0107118 | A1 | | 6/2004 | Harnsberger et al. | |
| 2005/0034107 | A1 | | 2/2005 | Kendall et al. | |
| 2006/0074980 | A1 | | 4/2006 | Sarkar | |
| 2008/0059448 | A1 | * | 3/2008 | Chang et al. | 707/5 |
| 2008/0189250 | A1 | * | 8/2008 | Cha et al. | 707/3 |
| 2010/0205044 | A1 | * | 8/2010 | Scheer | 705/10 |

OTHER PUBLICATIONS

Handschuh et al., "Leveraging Metadata Creation for the Semantic Web with CREAM", Advances in Artificial Intelligence: 26th Annual German Conference on AI, 2003, http://www.aifb.uni-karlsruhe.de/WBS/sha/papers/ki2003.pdf.
Metaweb Architecture, Freebase Help Center, 2007, http://www.freebase.com/view/guid/9202a8c04000641f800000000544e143.
Notice of Allowance for U.S. Appl. No. 12/323,193; date of mailing: Dec. 16, 2009, 4 pages.
Amendment After Non-Final for U.S. Appl. No. 12/323,193, filed Aug. 4, 2009, 5 pages.
Updated Accelerated Examination Support Document for U.S. Appl. No. 12/323,193, filed Aug. 4, 2009, 7 pages.
Terminal Disclaimer for U.S. Appl. No. 12/323,193, filed Aug. 4, 2009, 1 page.

(Continued)

*Primary Examiner* — Angela M Lie
(74) *Attorney, Agent, or Firm* — Oppenheimer Wolff & Donnelly LLP

(57) ABSTRACT

One aspect of the present invention includes dynamically selecting templates through the use of an ontology. In one embodiment, an ontology is defined to structure information system content, and an ontology classification is then assigned when content is provided to the information system. Based on this classification, the most appropriate template classified in the ontology is applied to the content. If a template exists at the content item's ontology level, this template is applied to the content. If no template exists, then the ontology tree is navigated upward to locate a template at the nearest ancestor ontology level. If a template was found by navigating the ontology tree, then this template is applied to the content item.

10 Claims, 2 Drawing Sheets

OTHER PUBLICATIONS

Examiner Interview Summary for U.S. Appl. No. 12/323,193, date of mailing: Jul. 23, 2009, 2 pages.
Non-Final Rejection Office Action for U.S. Appl. No. 12/323,193, date of mailing: Jul. 8, 2009, 10 pages.
Examination Support Document for U.S. Appl. No. 12/323,193, filed Nov. 25, 2008, 6 pages.
Statement for Pre-examination Search for U.S. Appl. No. 12/323,193, filed Nov. 25, 2008, 6 pages.

* cited by examiner

101

DYNAMIC ONTOLOGY-DRIVEN TEMPLATE SELECTION

FIELD OF THE INVENTION

The present invention generally relates to the use of information services. The present invention more specifically relates to the dynamic selection of templates for content provided to an information system or knowledge base.

BACKGROUND OF THE INVENTION

Starter templates have long been used to provide content providers with guidance on creating content. For example, many word processing programs utilize a new document wizard to create a specific type of document from a template. The drawback to current uses of templates is that they require users to select a template from a predefined list. The user must know the name of the template they wish to use and select the correct template. If a template is not provided for the type of content they are creating, the user must determine if any other template listed could be used for their content, and select the next best match. Further, the user may have to examine the contents of each template and make a determination as to which template best fits. This process may result in the user choosing the wrong template, or not using a template, in addition to inconsistent content and lost productivity.

User-defined knowledge bases such as Wikis commonly employ templates, such that when the user creates a wiki page or article the user is presented with a list of available templates in the wiki space. However, the template names are selected by the template creator and thus are arbitrary and not necessarily intuitive to the user. Unless the user knows the content of the template, or has been instructed to use the best template, the user may again choose the wrong template, not use a template, or be required to examine the contents of each template and make a determination as to which template best fits their needs.

One recent application of information services which allow content on the world wide web to be defined and classified in a human-usable format is known as the "semantic web." The semantic web provides great promise for adding structure to the vast amount of information on the web by defining and creating relationships between what would otherwise be unconnected data. In order to release the benefits of the semantic web, however, semantic statements must be added to the web content to enable processing by semantic engines. Ontologies are utilized to add structure to semantic web content, and the structure defined by each ontology must be associated with the web content so that machines can determine the semantic relationships from the content. However, a large problem currently exists in convincing the average user to add the correct semantic statements (such as applying a correct classification or relationship) to their web content.

What is needed in the art is an automatic selection of templates to accurately and efficiently assist a user when creating or classifying content. Further, an automatic selection of templates would be particularly useful in assisting the creation of semantic web content.

BRIEF SUMMARY OF THE INVENTION

One aspect of the present invention allows the intelligent automatic selection of appropriate content templates in a knowledge-base or other information system through an ontology. In one embodiment, an ontology is first defined to enable the classification of content within the information system. Next, content items are provided to the information system or otherwise classified within the information system. This classification includes assigning an ontology classification to the content item from a selected level of the ontology.

After the content item is placed at a level of the ontology, a template is located for the content item from the templates within the information system. Each template is classified to an ontology level, and contains the required properties and attributes to apply to the content item.

To select the appropriate template, the ontology tree or hierarchy is navigated to locate the closest template match. If a template is classified at the same ontology level as the content item, this template is selected. If a template does not exist at the ontology level of the content item, the ontology is traversed upward to select a template at the nearest ancestor of the selected ontology level. If a template was identified and selected from the ontology, this template is applied to the content item. If no template was identified after navigating the ontology tree to its root, then no template is applied to the content item.

DETAILED DESCRIPTION OF THE INVENTION

In one aspect of the present invention, appropriate templates for content in an information system can be intelligently selected based upon the ontology of the content within the system. In contrast to the many content creation products that merely apply templates once the correct template is selected, the present invention utilizes ontologies and their ability to describe and create relationships to dynamically select the appropriate template. Accordingly, the use of ontological classes and inferencing provides advantages to enable the selection of the correct template for disparate types of content introduced into the information system.

A further aspect of the present invention is that the content creator does not need a high degree of knowledge of what ontological annotations or classifications need to be added or applied to the content document. Instead, the creator of content only needs to fill in the content and the proper template classification will dynamically be provided. All of the ontological knowledge needed to annotate the document correctly is contained in the template, thus reducing the skill level needed by the content creator.

Figure 1:
FIG. 1 illustrates an example ontology tree in accordance with one embodiment of the present invention.

FIG. 1 demonstrates an ontology tree in accordance with one embodiment of the present invention. As is shown, in tree 101, parent/child relationships exist in an ontology depicted as a hierarchy between related concepts, depicted in FIG. 1 as geographical concepts. For example, under "Countries", a number of countries such as "Canada", "France", "Great Britain", "India", and "United States" are listed. Further, at the base of the ontology tree, there is the concept of "Oceans", with the "Arctic Ocean", "Atlantic Ocean", "Indian Ocean", and "Pacific Ocean" listed.

As further shown in tree 101, there only exists the ontology elements as are defined in the ontology. For example, only three states appear in the ontology under United States>States, although there are many more states which could be classified. However, even if a state such as "Rhode Island" is not listed in the ontology, a content item for Rhode Island could still be properly be classified at the "States" ontology level.

In one embodiment of the present invention, when a user defines the ontology or creates an instance of a specific ontology class within an existing ontology, the user is then presented with the ability to define a Template. This Template contains all the properties of the class as well as the properties of the inherited classes. The properties of the ontological class are accordingly defined by the ontology designer.

The template itself, however, is applied by the end user and associated to the content items in the ontology by a semantic relationship defined by the users of the system, not the designers of the ontology. This approach along with "climbing" the ontology hierarchy to search for the most applicable template enables a flexible semantic relationship for creating content.

In a further embodiment of the present invention, at the time that a template is created, the template is assigned a semantic relationship to a class (or category) from the ontology. The name that is given to the template is irrelevant, eliminating the ambiguity of templates names which can cause confusion as in typical products which use templates. The use of ontologies instead provides the ability to programmatically select the "next best template" by leveraging an ontological inference to later "walk up" the inheritance tree, thus finding templates that are from the same class (or category) family. Accordingly, the selection of the "correct" template is programmatic based on the type of content the user is creating.

In still a further embodiment of the present invention, when a content creator wants to create or classify new content within the information system, the system utilizes the ontology class of the content to first determine if a template exists for the ontology at that level. If no templates exist at that particular class level, the system traverses up the ontology tree and looks to see if a template has been assigned for the parent of that class. If no templates are assigned for the parent, it looks for a template assigned to the parent's parent. Thus, the system continually traverses up the tree until it finds a template or until it reaches the root of the tree. If no templates exist at the root of the tree, then no templates are applied to the content.

Figure 2:
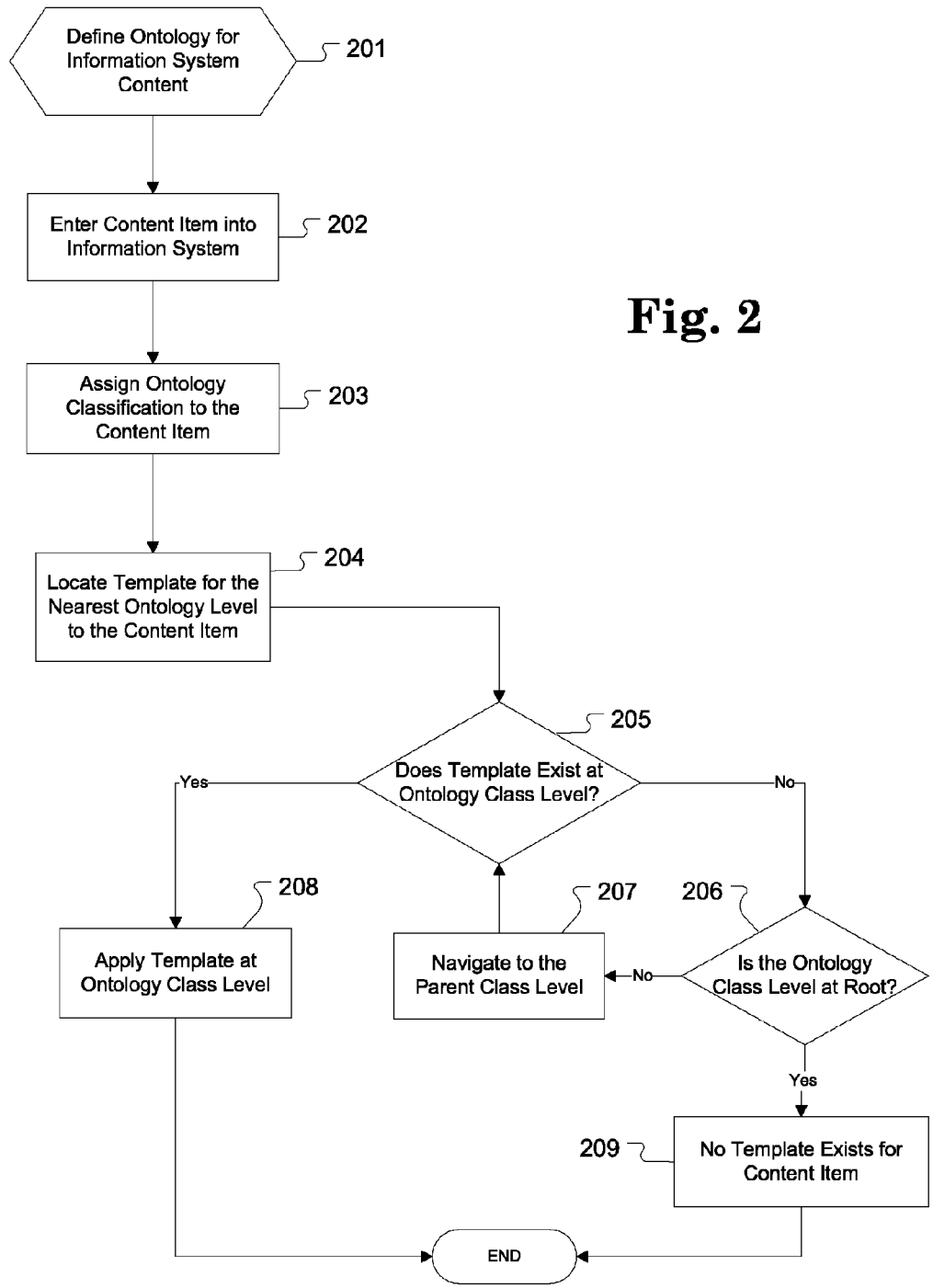
FIG. 2 illustrates an example operation of the method for selecting templates through the use of dynamic ontology within an information system in accordance with one embodiment of the present invention.

FIG. 2 further illustrates an exemplary operation of the method for dynamically selecting templates through the use of an ontology within an information system in accordance with one embodiment of the present invention. As is depicted in step 201, an ontology is first defined for content within the information system.

Next, as in step 202, content is created and/or entered into the information system in order to have a template applied to the content. An ontology classification for this content item is assigned to the content item from the previously defined ontology as in step 203. The concluding steps then involve locating a template for the nearest ontology level to the content item as in step 204, and applying the located template as in step 208. Accordingly, if a template exists at the ontology class level of the content item as in steps 205 and 208, then this template is applied to the content item.

Steps 205-209 further depict an example navigation of an ontology tree for classification of content in an information system, and the process taken to locate and assign a template if a template does not exist at the ontology class level of the content item. If no template exists at the ontology class level of the content item per step 205, then the ontology hierarchy is navigated upward. If the ontology class level is at the root of the ontology as in step 206, then no template exists within the ontology as in step 207. If the ontology class level is not at the root of the ontology as in 206, then the ontology continues to be navigated upward to a parent class level as in step 207 until either a template is found at the parent class level and applied as in step 208, or the ontology class level reaches root and does not contain an template. If no ontology class level is located at the root of the ontology as in step 206 without discovering a template, then no template exists for the content item as in step 209, and therefore no template will be applied to the content item.

As a further example of how the process of creating content from templates is implemented by one embodiment of the present invention, the following example is described. For this example assume that an ontology exists with a class of "Web Services" that is a sub class of "IT Technology". At the time that the "subject matter expert" creates a template, the "subject matter expert" then creates a relationship between the template and the ontological class "IT Technology", such that the template relationship "isTemplateFor" this class level. The template accordingly contains definitions to provide all the required content for an article about "IT Technology".

Later, when a user or other content contributor creates a new article in the information system, the user is asked to classify the article. For this example, the user is creating an article on REST web services, so the user picks the classification "Web Services" from the ontology classification. The system now programmatically interrogates the ontology looking for a template that has the relationship "isTemplateFor Web Services". In this example, there is no template defined for this specific relationship.

The system will use inferencing to walk the inheritance tree of the ontology to find the best template to use for the "REST Web Services" article. In this example, the template that has the relationship "isTemplateFor" for the ancestor class "IT Technology" would be selected.

Thus, a consistent template selection is produced for the creation of new content, even when a template does not exist for the exact classification selected for the content. The system is enabled to programmatically select the same template for every article of the same classification, meaning that the selection of the correct template is determined by the subject matter expert who defines the ontology.

By use of ontology classes and inferencing, the need to create a template for every type of article in the system is eliminated. Instead, the relationships and inheritance through inference already existing allow a system to programmatically select the "best fit" template defined in the system. Any ambiguity of the exact name choice for the template is removed.

Aspects of the present invention could be implemented in any knowledge management system, for example, a Wiki. Wiki applications can also be enhanced to contain an ontology, where each Wiki content page is an instance of an ontology class. For example, a Wiki page about Afghan Hound could be under the Dog ontology class. A template for the Dog ontology class could be created so that each dog Wiki page would have the same look and feel as well as required and optional tags and annotations. If no templates have been assigned to the Dog ontology class, the system would navigate the parent class Mammal and see if a template has been assigned to the Mammal class. The system would continually crawl up the ontology tree until it either finds a template or reaches the root of the ontology tree.

Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A method for utilizing an ontology within an information system, comprising:
defining an ontology to categorize content contained within a plurality of electronic content files provided to an information system;
receiving an electronic content file at the information system, the electronic content file containing new content;
assigning an ontology classification to the electronic content file from a level of the ontology based on the new content contained in the electronic content file;
selecting a template for the electronic content file from a set of templates within the information system based on the ontology classification of the electronic content file, each template classified to at least one level of the ontology, and each template specifying requirements for new content added to the information system using the template, wherein the requirements define content structure, minimum content specifications, and additional contents required for inclusion within the information system, and wherein selecting a template for the electronic content file includes:
identifying a template classified at the ontology level of the electronic content file if a template is classified therein;
identifying a template classified elsewhere within the ontology if a template is not classified at the ontology level of the electronic content file by traversing the ontology to locate a template at a nearest ancestor of the ontology level of the electronic content file; and
applying, if a template was identified within the ontology, the selected template and the requirements of the selected template to the electronic content file; and
implementing any applicable changes to the new content of the electronic content file resulting from applying the requirements of the selected template to the new content of the electronic content file, the applicable changes to the new content implemented prior to addition of the electronic content file to the information system.

2. The method of claim 1, further comprising assigning a semantic relationship between a template and a level of an existing ontology responsive to a creation of a template within the information system.

3. The method of claim 1, further comprising defining a template responsive to creation of a new ontology or a new level of an existing ontology within the information system.

4. The method of claim 1, wherein inferencing techniques are used to traverse the ontology when locating the template at the nearest ancestor of the ontology level of the electronic content file.

5. The method of claim 1, wherein the electronic content file comprises a document.

6. An information system, comprising:
at least one processor within the information system;
at least one memory store within the information system having instructions operable with the at least one processor for utilizing an ontology to classify and enforce template requirements for new content items, the instructions being executed on hardware components within the storage management system for:
categorizing content contained within a plurality of electronic content files provided to an information system with an defined an ontology;
processing an electronic content file at the information system, the electronic content file containing new content;
assigning an ontology classification to the electronic content file from a level of the ontology based on the new content contained in the electronic content file;
selecting a template for the electronic content file from a set of templates within the information system based on the ontology classification of the electronic content file, each template classified to at least one level of the ontology, and each template specifying requirements for new content added to the information system using the template, wherein the requirements define content structure, minimum content specifications, and additional contents required for inclusion within the information system, and wherein selecting a template for the electronic content file includes:
identifying a template classified at the ontology level of the electronic content file if a template is classified therein;
identifying a template classified elsewhere within the ontology if a template is not classified at the ontology level of the electronic content file by traversing the ontology to locate a template at a nearest ancestor of the ontology level of the electronic content file; and
applying, if a template was identified within the ontology, the selected template and the requirements of the selected template to the electronic content file; and
implementing any applicable changes to the new content of the electronic content file resulting from applying the requirements of the selected template to the new content of the electronic content file, the applicable changes to the new content implemented prior to addition of the electronic content file to the information system.

7. The information system of claim 6, further comprising instructions being executed for assigning a semantic relationship between a template and a level of an existing ontology responsive to a creation of a template within the information system.

8. The information system of claim 6, further comprising instructions being executed for defining a template responsive to creation of a new ontology or a new level of an existing ontology within the information system.

9. The information system of claim 6, wherein inferencing techniques are used to traverse the ontology when locating the template at the nearest ancestor of the ontology level of the electronic content file.

10. The information system of claim 6, wherein the electronic content file comprises a document.

* * * * *